United States Patent [19]

Elkin

[11] Patent Number: 4,476,942
[45] Date of Patent: Oct. 16, 1984

[54] VARIABLE SPEED INLET CONTROL VALVE

[75] Inventor: Robert D. Elkin, Claremont, Calif.
[73] Assignee: Monogram Industries, Inc., Culver City, Calif.
[21] Appl. No.: 372,742
[22] Filed: Apr. 28, 1982
[51] Int. Cl.³ .............................................. B23B 45/04
[52] U.S. Cl. .................................... 173/169; 173/168; 173/170; 251/84; 251/DIG. 1
[58] Field of Search ................. 173/169, 161, 18, 168; 251/84, DIG. 1

[56] References Cited

U.S. PATENT DOCUMENTS

| | | | |
|---|---|---|---|
| 2,823,646 | 2/1958 | Brown | 173/169 |
| 3,510,099 | 5/1970 | Crump | 173/169 X |
| 3,635,605 | 1/1972 | Hall et al. | 173/169 X |
| 3,811,514 | 5/1974 | Blomberg et al. | 173/169 |
| 3,983,947 | 10/1976 | Wills et al. | 173/169 |
| 4,024,892 | 5/1977 | Prisco et al. | 173/169 X |
| 4,109,735 | 8/1978 | Bent | 173/169 X |
| 4,321,722 | 3/1982 | Klocke | 173/169 X |

Primary Examiner—E. R. Kazenske
Assistant Examiner—W. Fridie
Attorney, Agent, or Firm—Poms, Smith, Lande & Rose

[57] ABSTRACT

An inlet control valve particularly useful in connection with pneumatic tools or the like. The valve includes a longitudinally depressible member passing loosely through a frusto-conical plug in a matching frusto-conical valve seat. In the closed position, the plug is seated and the stem is sealed by an O-ring. As the trigger is depressed, the O-ring first releases a path for fluid flow about the shaft within the plug providing an idle speed. Further depressing of the trigger causes a shoulder to contact the plug and, thereafter, move the plug rearward which provides an increasing amount of fluid flow around the plug proportional to the amount of depression thus providing a variable speed.

5 Claims, 15 Drawing Figures

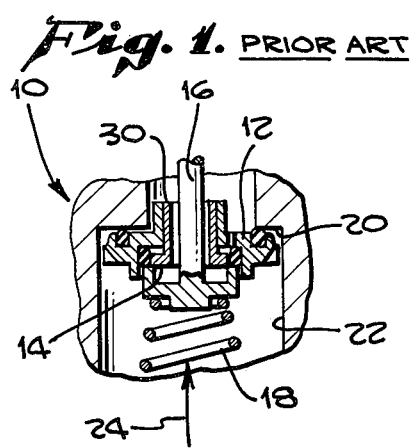
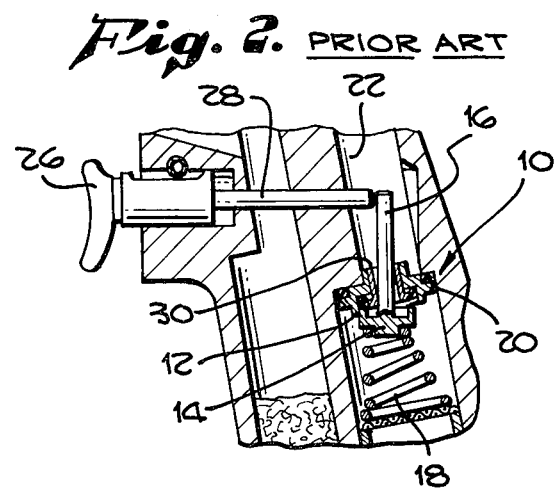
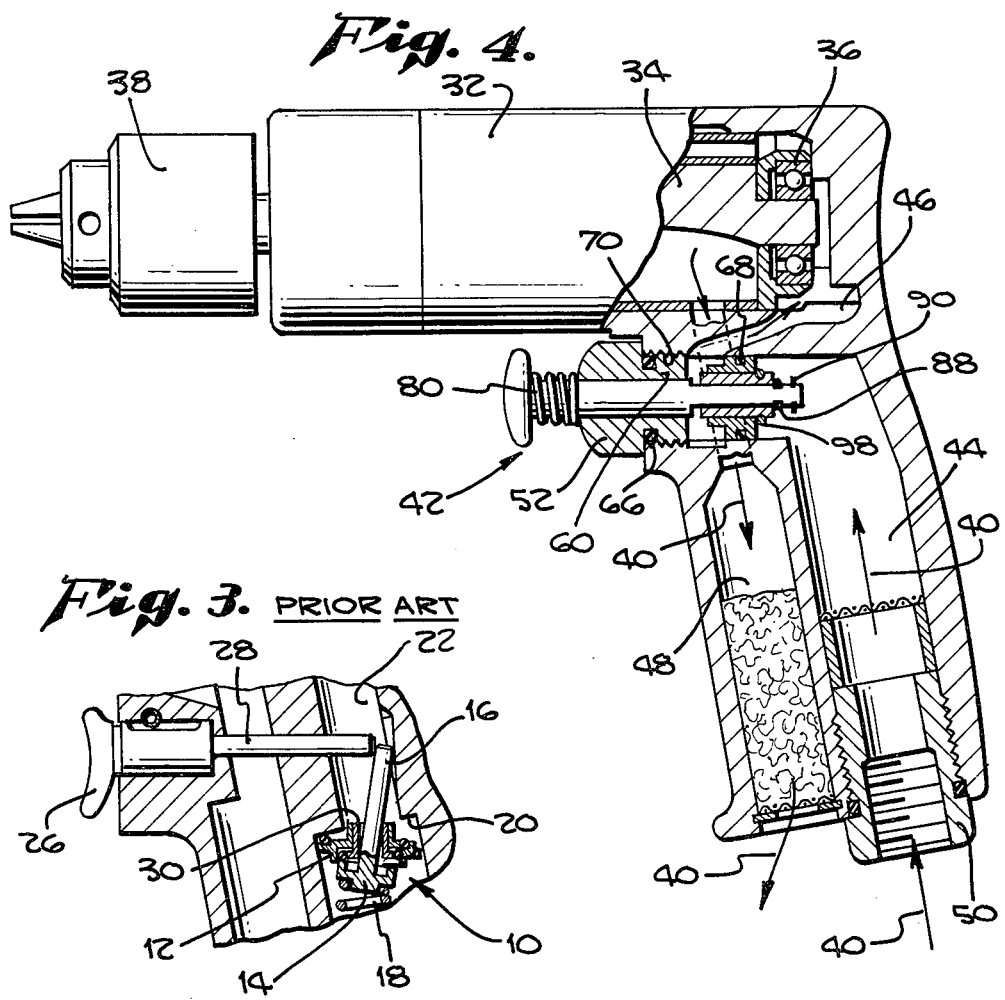

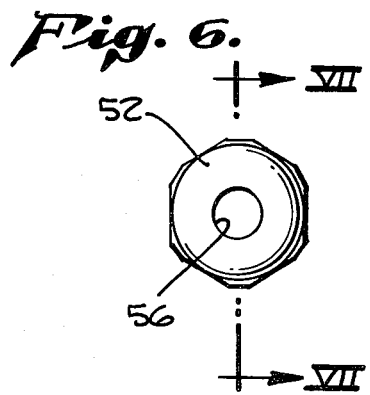
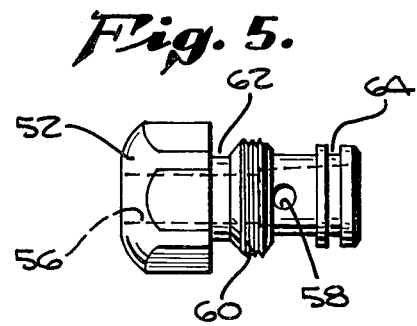
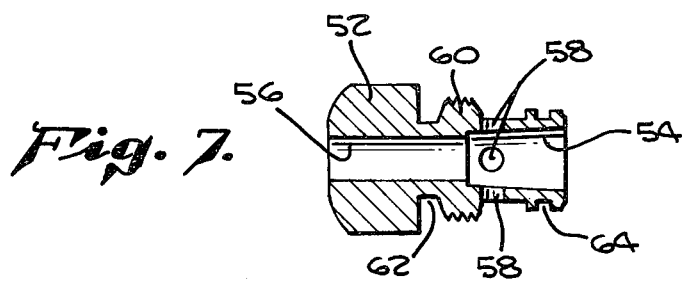
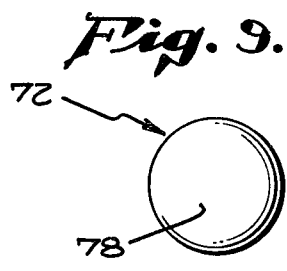
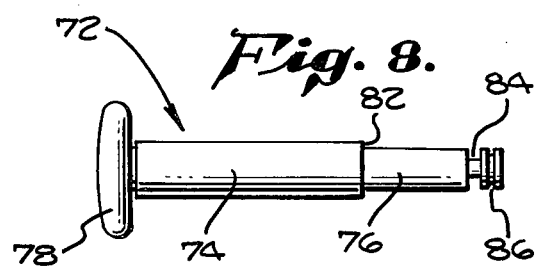
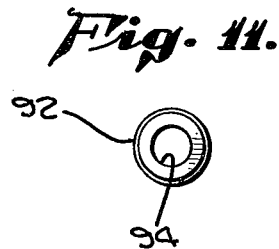
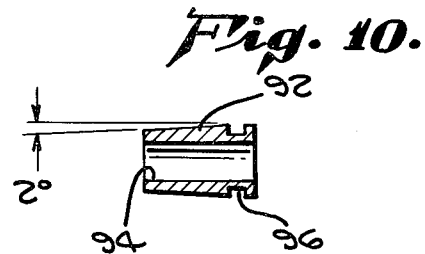

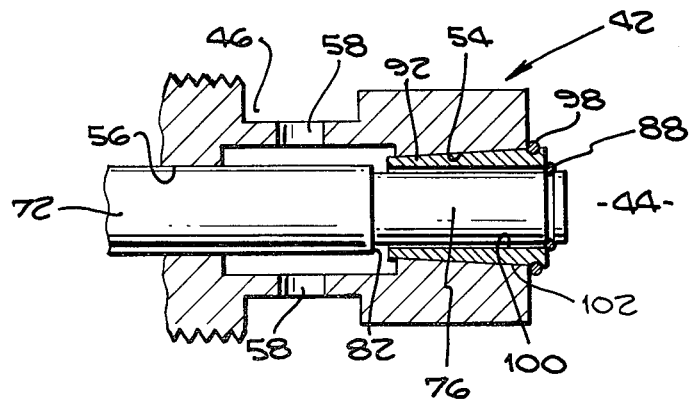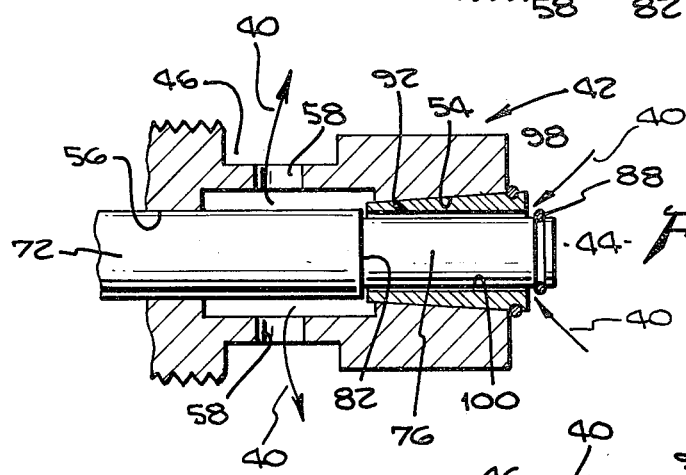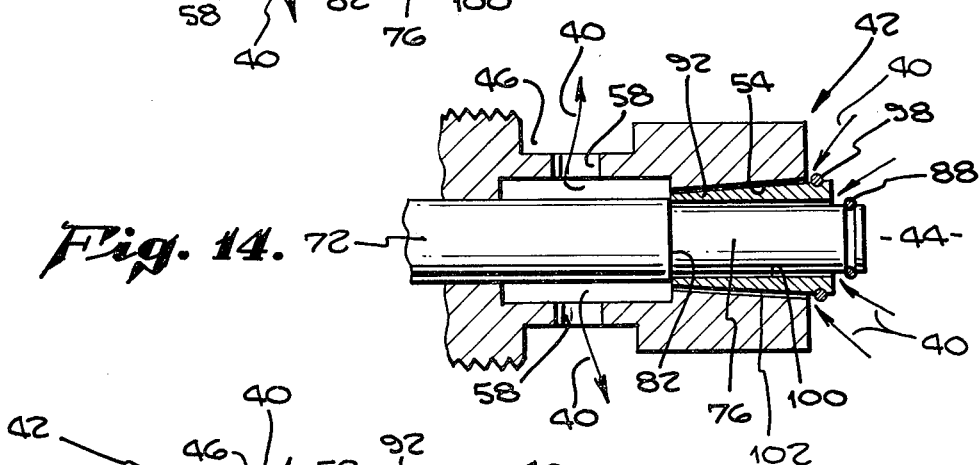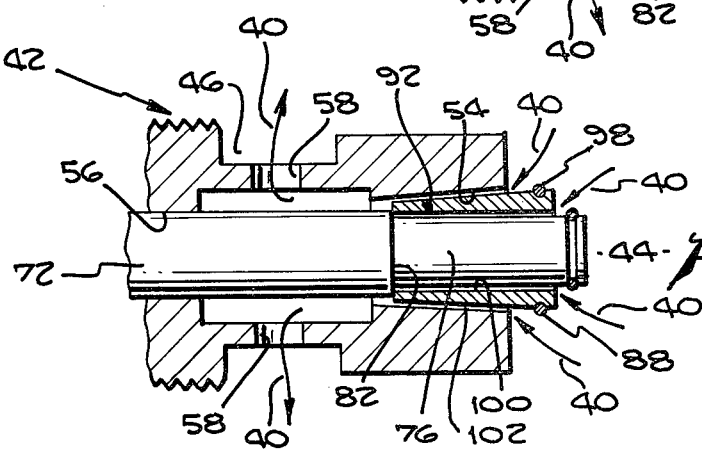

VARIABLE SPEED INLET CONTROL VALVE

BACKGROUND OF THE INVENTION

The present invention relates to inlet control valves for use in pneumatic systems and, more particularly, to inlet control valves useful with pneumatic tools.

In a rotating pneumatic tool such as a drill motor, the electric motor found in electric tools is replaced by an air turbine motor. Compressed air is fed to the tool and passes through the turbine motor to drive the tool and, thereafter, is exhausted to the atmosphere. To provide ease of operation and prevent the continuous operation of the tool, a valve operated by a trigger mechanism is normally included within the inlet passageway of the tool conducting the pressurized fluid, usually air.

Until recently, such valves have been, in one example, of a single tilting plate variety which afforded simple on/off control. With the advent of solid state electrical controls, the advantages of variable speed in an electric tool rapidly became very obvious. It was found to be highly desirable to allow a drill, for example, to first rotate slowly to establish its point of entry and thereafter increase the speed at which the drill is operating. With electric controls, true variable speed controllable throughout the range between virtually no rotation and full speed rotation was possible by the use of a miniaturized solid state rheostat mechanism contained within the tool and operated by the trigger mechanism.

A similar problem exists with pneumatic riveting hammers such as those used to rivet the skin on aircraft. The riveter and his assistant are on opposite sides of the skin section. The assistant places a bucking bar against the inner end of the rivet and the riveter applies the rivet hammer to the rivet head. When the hammer is activated, if everything is properly aligned, a piston reciprocates and hammers the rivet against the bucking bar to its set condition. Unfortunately, the riveter and the assistant are on opposite sides of the skin and cannot see each other. It is not uncommon for the rivet hammer to be on one rivet and the bucking bar to be on another. Sudden application of full power can result in slipping of the tools and damage to the valuable aircraft skin. A variable speed operation would allow the team members to assure proper alignment of the tools on the same rivet before full setting power was applied.

Unfortunately, no such full-range variable speed control has been available for pneumatic tools. Recently, Eckman disclosed in his U.S. Pat. No. 4,258,799 a two-speed inlet valve implemented by merely doubling up the tilt valve used previously. The operation of Eckman's valve is shown in FIGS. 1-3. The valve, generally indicated as 10, comprises a first annular disc 12 having a second annular disc 14 covering a hole in the open center of the first disc 12. An operating shaft 16 extends downstream from the second disc 14 through the center of the first disc 12. A spring 18 biases the two discs 12, 14 against shoulder 20 of the passageway 22. Pressurized fluid is contained within passageway 22 attempting to flow in the direction of arrow 24. FIG. 1 shows the valve 10 in its "off" condition.

In FIG. 2, the valve 10 is shown in its first level (i.e. slow speed) "on" position. The trigger 26 has been depressed sufficiently to cause shaft 28 to contact the operating shaft 16 and tilt the second annular disc 14 away from the first annular disc 12 exposing the hole therein. In FIG. 3, the valve 10 has been opened to its second level (i.e. fast speed) "on" position. The shaft 28 has continued to force operating shaft 16 away from its normal longitudinal alignment into contact with the upper shoulder 30 surrounding the open center of the first annular disc 12 to, thereby, tilt the first annular disc 12 away from shoulder 20 thus fully opening the passageway 22. As can be seen, there is no variable speed operation, valve 10 is either "off", "on" at low speed, or "on" at high speed.

Wherefore, it is the object of the present invention to provide an inlet control valve particularly suited for such air operated tools providing true variable speed operation throughout the full speed range in the manner of electrically operated tools.

SUMMARY

The foregoing objective has been met in a preferred embodiment by the inlet control valve of the present invention for controlling the flow of fluids through a passageway from a source under pressure comprising a body member adapted to be sealably inserted into the passageway, the body member having first, second, and third bores therein, said first bore communicating with the passageway on the pressurized fluid side and tapering inwardly, the second bore being a substantially cylindrical bore concentrically aligned with the first bore and communicating with the space outside of the passageway from which the valve is to be operated, the third bore communicating between the passageway on the downstream side and the first and second bores adjacent their juncture; a tapered plug disposed within and adapted to sealably fit into the first bore, the plug having a fourth bore therethrough cylindrically and concentrically aligned with the first and second bores; an operating member disposed within the first and second bores, the operating member being adapted to be longitudinally depressed to operate the valve, the operating member comprising a first cylindrical portion adapted to sealably and slidably fit within the second bore and a second cylindrical portion adapted to slide with a clearance fit within the fourth bore, the operating member being slidable within the first, second, and fourth bores between closed, idling, and full-open positions, the operating member including means for fluid sealing the space between the second cylindrical portion and the fourth bore when the operating member is in a closed position; the operating member including means for contacting the plug upon reaching the idle position and for carrying the plug longitudinally out of the first bore in combination with the operating member as the operating member is moved between the idling position and the full open position whereby an increasing opening is created in the passageway as the operating member is moved from the idling position to the full-open position; and, bias means operably disposed to urge the operating member towards the closed position.

DESCRIPTION OF THE DRAWINGS

FIGS. 1-3 show the workings of the prior art valve of Eckman in the fully closed, low-speed, and high-speed positions, respectively.

FIG. 4 is a partially cutaway elevation of an air-powered drill motor including a valve according to the present invention.

FIG. 5 is a side view of the body member of the valve of the present invention.

FIG. 6 is an end view of the body member of FIG. 5.

FIG. 7 is a cutaway side view of the body member of FIGS. 5 and 6 in the plane VII—VII.

FIG. 8 is a side view of the operating member of the valve of the present invention.

FIG. 9 is an end view of the operating member of FIG. 8.

FIG. 10 is a cutaway side view of the tapered plug of the valve of the present invention.

FIG. 11 is an end view of the tapered plug of FIG. 10.

FIG. 12 is a simplified cutaway drawing of the valve of the present invention in its fully closed position.

FIG. 13 is a simplified cutaway drawing of the valve of the present invention in its idling position.

FIGS. 14 and 15 are simplified cutaway drawings of the valve of the present invention showing the increasing opening of the valve as the operating member is depressed from low-speed to high-speed in FIGS. 14 and 15, respectively.

DESCRIPTION OF THE PREFERRED EMBODIMENT

The construction of the valve of the present invention can best be understood with reference to FIGS. 4–11. FIG. 4 shows a drill motor having the valve in its assembled state incorporated therein. The same valve could be used in a rivet hammer. FIGS. 5–11 show the specific construction of the individual components in a tested embodiment. The drill motor 32 has a turbine motor 34 mounted for rotation on bearings 36 to drive the chuck 38. Drill motor 32 includes a passageway for the flow of pressurized air therethrough, the air being indicated by arrows 40. The valve of the present invention, generally indicated as 42, is disposed within the passageway which comprises an entry portion 44, a middle portion 46, and an exit portion 48. Other routing of the passageway could, of course, be employed. As can be seen, the pressurized air 40 enters through the inlet fitting 50 from an air hose (not shown) into the entry portion 44 of the passageway. The valve 42 is disposed between the entry portion 44 and the middle portion 46. Thus, when the valve 42 is in its closed position, the air 40 cannot pass from the entry portion 44 to the middle portion 46 and the drill motor 32 is inoperative. Opening of the valve 42 allows the air 40 to flow through the valve 42 into the middle portion 46 and from thence through the turbine motor 34 to exit through the exit portion 48 to the atmosphere. The valve 42 is designed to provide an adjustable opening in the passgeway for the flow of the air 40 therethrough such that the turbine motor 34 can be selectably adjusted in its speed.

Referring now to FIGS. 5–7, the detail of the body member 52 can be seen. Body member 52 has a first bore 54 therein being a frusto-conical bore tapering towards the interior of the body member 52. It will be obvious to those skilled in the art that other shapes could be used as well. A second bore 56 is concentrically aligned with the first bore 54. Second bore 56 is cylindrical and, in combination with the first bore 54, provides a passageway throughout the length of the body member 52. A plurality of third bores 58 are disposed normal to the first and second bores 56, 58 communicating with the first and second bores 54, 56 at about their junction. Body member 52 has a threaded portion 60 which allows it to be threadedly inserted into the drill motor 32 to position it in the passgeway as shown. As can be seen, body member 52 has two concentric grooves 62 and 64 into which O-rings 66 and 68, respectively, are inserted.

The passageway is so configured in the drill motor 32 such that when the body member 52 is threaded into the drill motor 32 in the threaded opening 70 provided therefor, the O-rings 66, 68 seal the valve 42 into position such that the flow of air 40 is into the first bore 54 and, assuming second bore 56 to be blocked (as will be the case), out the third bores 58 into the middle portion 46 of the passageway.

Turning now to FIGS. 8 and 9, the operating member is shown in detail. The operating member, generally indicated as 72, comprises a first cylindrical portion 74 and a second cylindrical portion 76 concentrically aligned with one another. A trigger portion 78 is on the outer end of the first cylindrical portion 74 to be depressed by the operator to, thereby, move the operating member 72 longitudinally. As can also be seen in FIG. 4, a helical spring 80 is disposed about the first cylindrical portions 74 between the trigger portion 78 and the body member 52 of valve 42 when the valve 42 is in its assembled position. The spring 80, thus disposed, tends to urge the valve 42 to its closed position in a manner to be described in greater detail hereinafter. The first cylindrical portion 74 is sized with respect to the second bore 56 such that there is a sealable sliding fit therebetween. The second cylindrical portion 76 is of slightly smaller diameter than the first cylindrical portion 74 such that a shoulder 82 is created therebetween. The second cylindrical portion 76 contains an inner groove 84 and an outer groove 86. The inner groove 84 is sized to receive an O-ring 88 and the outer groove 86 is sized to receive a spring-steel keeper 90 which prevents the operating member from coming out of body member 52 if O-ring 88 breaks.

Turning now to FIGS. 10 and 11, the tapered plug 92 is shown. Tapered plug 92 has a longitudinal bore 94 therethrough which is cylindrical and sized with respect to the second cylindrical portion 76 of the operating member 72 such that when the tapered plug 92 is mounted thereon, there is a clearance fit therebetween which will allow the limited passage of air therethrough so as to create an idle speed on the drill motor 32. This will be discussed in greater detail hereinafter. The tapered plug 92 in the tested embodiment has about 2° of taper and is preferred. Accordingly, the first bore 54 of the body member 52 also has a 2° taper such that the tapered plug 92 and the first bore 54 match and the tapered plug 92 can sealably close the first bore 54 when fully mated therewith. The tapered plug 92 also contains a groove 96 at its outer end into which yet another O-ring 98 is placed.

Turning now to FIGS. 12–15, the operation of the valve will be described with respect to those simplified drawings. It should be understood that those drawings are inexact so as to better show the operation. In FIG. 12, the valve 42 is shown in its fully closed position. The tapered plug 92 is fully seated within the first bore 54. Additionally, the O-ring 98 is compressed against the juncture of the tapered plug 92 and the first bore 94 so as to completely assure the non-passage of air 40 from the entry portion 44 to the middle portion 46 of the passageway. The O-ring 88 is compressed tightly against the juncture of the second cylindrical portion 76 and the longitudinal bore 94 of the tapered plug 92 to also assure the non-passage of air 40 through the clearance area 100 therebetween. It will be remembered that the helical spring 80 is pushing against the trigger portion 78 so as to urge the operating member 72 to the left as FIG. 12 is viewed. This biasing action of spring 80 against the operating member 72 urges the O-ring 88 against the tapered plug 92 causing the entire assembly to tightly mate and seal. As will be noted in FIG. 12, in the closed position, the shoulder 82 on the operating member 72 is spaced from the inner end of the tapered plug 92. This is done intentionally and provides a "feel" for the operating action of the valve 42 which has been found to be desirable to persons operating such tools as the drill motor 32. That is, a certain amount of free play is provided in the idle mode before the faster operation of the drill motor is begun. This action can be seen with respect to the idling position of the valve 42 now to be described.

Turning now to FIG. 13, the valve 42 is shown in simplified form in its idling position. Valve 42 is in its idling position from the time the operating member 72 is moved longitudinally to the right as FIG. 13 is viewed as by depressing the trigger 78 from a point where the O-ring 88 no longer seals the clearance area 100 until such time as the shoulder 82 contacts the tapered plug 92. During that limited portion of travel, air 40 can move in a fixed, slight amount through the clearance area 100 from entry portion 44 into the middle portion 46 to, thereby, drive the drill motor 32 at a low, idling speed.

As the operating member is depressed further, therefore moving further to the right as the figures are viewed, the shoulder 82 urges the tapered plug 92 out of the first bore 54. At first, just a slight clearance area 102 is created between the tapered plug 92 and the first bore 54. This condition is depicted in FIG. 14. Additional air 40 can move therebetween to join with the air 40 moving through the clearance area 100 to, thereby, increase the speed of the drill motor 32. Because of the tapered nature of the tapered plug 92 and the first bore 54, as the operating member 72 is depressed further, the clearance area 102 increases in proportion to the amount of displacement of the operating member 72. Thus, as the operating member is moved between the idling position and the full-open position of FIG. 15, the clearance area 102 increases linearly therewith. This results in a continual and linear increase in the speed of the drill motor. As pressure on the trigger 78 is decreased and the operating member 72 moves towards the close position; i.e., from the position of FIG. 15 towards the position of FIG. 14; the clearance area 102 progressively closes down and proportionally decreases the amount of air 40 which can pass therethrough causing a corresponding proportional and linear decrease in the operating speed of the drill motor 32. Thus, it can be seen that the valve of the present invention provides the true variable speed operation desired.

Wherefore, having thus described my invention, I claim:

1. A variable speed inlet control valve for controlling the flow of fluid through a passgeway from a source under pressure, said valve comprising:
   (a) a body member adapted to be sealably inserted into the passageway, said body member having first, second, and third bores therein, said first bore communicating with the passageway on the pressurized fluid side, said first bore having an internal surface of decreasing cross-sectional diameter from said pressurized fluid side to the non-pressurized fluid side of said valve, said second bore being a substantially cylindrical bore concentrically aligned with said first bore and communicating with the space outside of the passageway from which the valve is to be operated, said third bore communicating between the passageway on the downstream side and said first and second bores adjacent there junction;
   (b) a tapered plug disposed within and conforming to said tapered first bore and adapted to sealably fit into said first bore in a first position therein;
   said tapered plug having an outer surface of decreasing cross-sectional diameter from said pressurized fluid side to said non-pressurized fluid side, said internal surface of said first bore of decreasing cross-sectional diameter and said outer surface of said tapered plug providing means for creating an opening around said plug within said first bore of increasing volumetric capacity as said operating member is operated to move said plug out of mating engagement with said tapered bore thereby providing an increasing amount of fluid flow around said plug proportional to the amount of depression of said operating, the cross-section about the internal surface of said first bore and the cross-section through the outer wall of said plug when said first bore and said plug are in said one position being essentially coincident, said plug having a fourth bore therethrough which is cylindrical in shape and concentrically aligned with said first and second bores;
   (c) an operating member disposed within said fourth and second bores, said member being adapted to be longitudinally depressed to operate the valve, said member comprising a first cylindrical portion adapted to sealably and slidably fit within said second bore and a second cylindrical portion adapted to slide with a clearance fit within said fourth bore, said operating member being slidably within said first, second, and fourth bores between closed, idling, and full-open positions, said operating member including means for fluid sealing the space between said second cylindrical portion and said fourth bore when said operating member is in said closed position, said operating member including means for contacting said plug upon reaching said idle position and for carrying said plug longitudinally out of said first bore from its first position therein in combination with said operating member as said operating member is moved between said idle position and said full open position whereby an opening of increasing volumetric capacity is created in the passageway as said operating member is moved from said idling position to said full-open position thereby providing an increasing amount of fluid flow around said plug proportional to the extent of movement of said operating member from its idle position;

and,
   (d) bias means operably disposed to urge said operating member towards said closed position.

2. The valve of claim 1 wherein:
said plug is frusto-conical in shape.

3. The valve of claim 1 and additionally:
sealing means carried by said plug for sealing the joint between said plug and said first bore when said operating member is between said closed and said idling positions.

4. The valve of claim 1 wherein:
said first cylindrical portion has a greater diameter than said second cylindrical portion so that said contacting means comprises a shoulder at their junction.

5. The valve of claim 1 wherein:

(a) said operating member includes an enlarged trigger portion to be depressed to operate the valve; and, (b) said bias means comprises a helical spring disposed about said first cylindrical portion between said trigger portion and said body member.

* * * * *